Sept. 1, 1970
H. B. ANDREW
3,526,842
APPARATUS FOR DETECTING SIGNAL IN PRESENCE OF NOISE
AND FOR SIMULTANEOUSLY DETERMINING FREQUENCY
AND PHASE OF DETECTED SIGNAL
Filed May 5, 1967
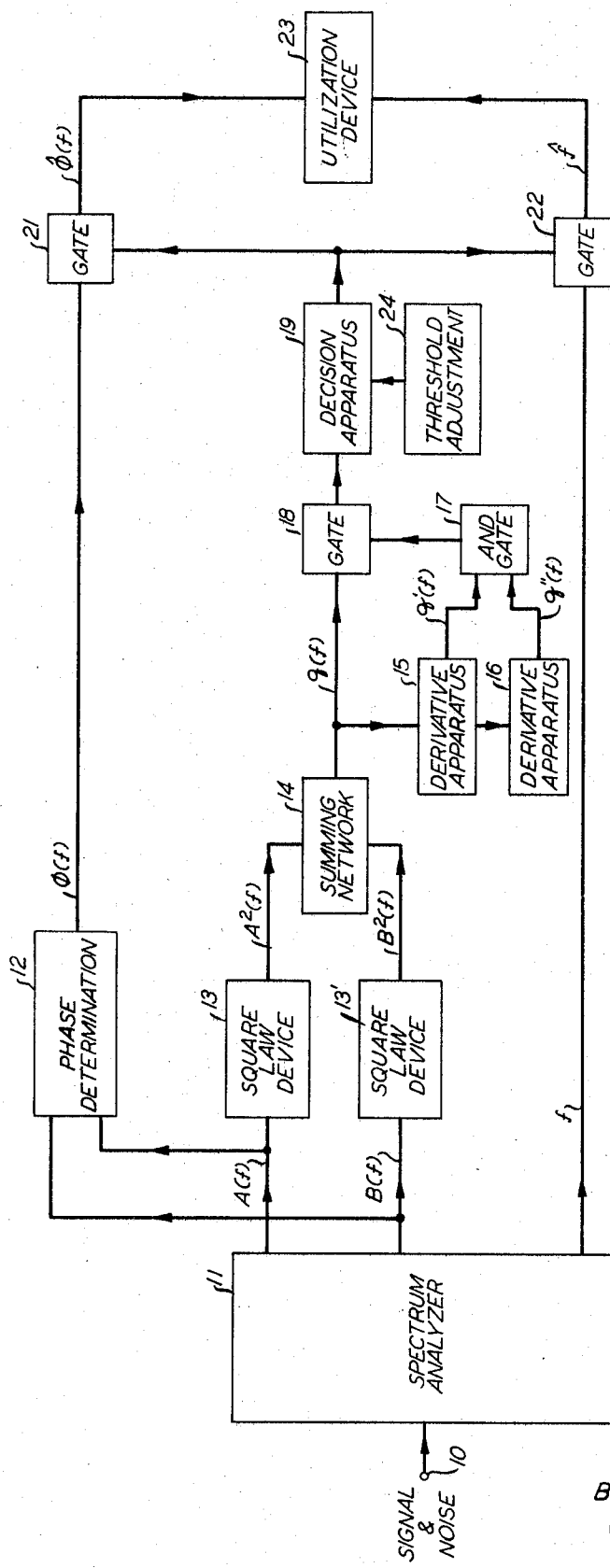
INVENTOR
H. B. ANDREW
BY G. E. Hirsch Jr.
ATTORNEY United States Patent Office 3,526,842
Patented Sept. 1, 1970

3,526,842
APPARATUS FOR DETECTING SIGNAL IN PRESENCE OF NOISE AND FOR SIMULTANEOUSLY DETERMINING FREQUENCY AND PHASE OF DETECTED SIGNAL
Harold B. Andrew, Chatham, N.J., assignor to Bell Telephone Laboratories, Incorporated, Murray Hill and Berkeley Heights, N.J., a corporation of New York
Filed May 5, 1967, Ser. No. 636,408
Int. Cl. H04b 15/00
U.S. Cl. 328—165        5 Claims

ABSTRACT OF THE DISCLOSURE

Every received intelligence signal is to some degree contaminated by noise. Not only is it important that a signal be detected in the presence of noise but, also, that the parameters of detected signals be simultaneously determined. A predetermined test function is utilized at a receiver to determine if an intelligence signal is present, and if present, to determine the phase and frequency of the received signal.

BACKGROUND OF THE INVENTION

Field of the invention

This invention pertains to signal detection apparatus and, more particularly, to apparatus for detecting signals and determining the parameters of said detected signals in the presence of undesired noise.

In every communications system a persistent problem is the presence of undesired noise. Any received intelligence signal is, to some degree, distorted or masked by noise. Noise in a generic sense may take many forms; exemplarily, it may be thermal noise generated in a receiver, or sea clutter return in a radar system, or distortion arising from multipath propagation. The essential nature of noise, that is, its randomness, lends itself to and also necessitates a statistical approach in solving a particular communication problem. The path from a purely mathematical approach, however, to a practical solution of a given communications problem has been beset by numerous problems, particularly those arising from the complexity of the equipment required. Fundamentally, it is desired that communications receive not only be capable of detecting the presence of an intelligence signal contaminated by noise but also be capable of simultaneously determining specified parameters of the detected signal, such as the phase and frequency of the signal.

Description of the prior art

A concise summary of the mathematical tools and techniques available to the communications engineer faced with the problem of designing apparatus for detecting signals contaminated by noise, may be found in chapter 14 of An Introduction to the Theory of Random Signals and Noise, authored by Davenport and Root, McGraw-Hill, 1958. Pat. 3,094,665, issued to A. J. Wildman on June 18, 1963, illustrates a more pragmatic approach to signal detection; the invention described therein compares the peak value of an applied noise and intelligence signal with a voltage proportional to the average value of the combined noise and intelligence signal. Gating means are utilized to develop an output signal indicative of the presence of an intelligence signal whenever the peak value exceeds a threshold corresponding to the average value of the combined signal.

Neither reference is directed to the detection of signals and the simultaneous determination of the parameters of a detected signal.

SUMMARY OF THE INVENTION

It is therefore an object of this invention to detect the presence of intelligence signals masked by noise.

Another object of this invention is to simultaneously determine certain parameters of signals detected in the presence of undesired noise.

In accordance with the principles of this invention, these and other objects are accomplished by turning to account certain statistical properties of signals contaminated by random noise. In particular, the instant invention is directed to those systems where the received information comprises one or more sinusoidal signals, with constant amplitude, phase and frequency, accompanied by additive Gaussian noise. It has been found that a predetermined test function or signal, corresponding to the sum of the squares of the real and imaginary components of the spectrum of the applied signal or signals, contains sufficient information to determine if an intelligence signal has been received and, if such is the case, the phase and frequency of the received signal.

More particularly, apparatus is utilized, in accordance with the invention, for developing a test function or signal and determining if a maximum occurs in the developed signal. The presence of a maximum in the test signal is indicative of the presence of a signal at the frequency at which the maximum occurs. If the test function exceeds a predetermined threshold, or bias, value at the indicated frequency, a decision is made that an intelligence signal of that frequency is present. Simultaneously, the phase of the received signal is determined, by apparatus for developing a signal proportional to the inverse tangent of the ratio of the real and imaginary components of the spectrum of the applied signal, at the indicated frequency. Accordingly, by the practice of this invention, the detection of a signal is accompanied by a determination of its phase and frequency.

These and further features and objects of this invention, its nature and various advantages may be more fully understood from the following discussion and by reference to the appended drawing.

DESCRIPTION OF THE DRAWING

The single figure of the drawing illustrates apparatus for simultaneously detecting intelligence signals masked by noise and determining the frequency and phase of the signals.

DETAILED DESCRIPTION OF THE INVENTION

Apparatus for simultaneously detecting signals contaminated by noise and determining the phase and frequency of said detected signals is illustrated in the single figure of the drawing. The signal applied to the input 10 of spectrum analyzer 11 may comprise one or more sinusoidal waves, having constant amplitude, phase and frequency, accompanied by additive Gaussian noise. Spectrum analyzer 11, which may be of the type shown and described in Pat. No. 3,217,251, issued to me on Nov. 9, 1965, develops three separate signals proportional respectively to the real, $A(f)$, and imaginary, $B(f)$, components of the spectrum of the applied signal, and to the value of the frequency $f$ for which the spectral components are determined. A signal proportional to the phase angle, $\varphi(f)$ of the applied signal, which in turn is proportional to the inverse tangent of the quotient of the real and imaginary components of the spectrum of the applied signal, is developed by phase determination apparatus 12. Apparatus 12 may comprise devices identical to those described in my above-identified patent for performing the same function.

The maximum likelihood estimate of the frequency of a received signal is, by definition, equal to the value of frequency $f$ for which the likelihood function is a maximum. It has been found that an accurate likelihood estimate of the frequency of a received signal is proportional to the sum of the squares of the real and imaginary components of the spectrum of the received signal. That is, the likelihood estimate is proportional to the sum of $A^2(f)$ and $B^2(f)$. Thus, the maximum likelihood estimate of the frequency of a received signal, contaminated by Gaussian noise, corresponds to the value of frequency $f$ for which this sum is a maximum.

Accordingly, square law devices, 13 and 13', which may be of the type described in my aforementioned patent, develop signals proportional to the squares of the real and imaginary components $A^2(f)$ and $B^2(f)$, respectively, of the spectrum of the received signal. The test function $q(f)$, that is the signal corresponding to the likelihood estimate, is developed by summing the two squared signals, in network 14, to develop a signal $q(f)$ proportional to $A^2(f)+B^2(f)$. Since the maximum likelihood estimate of the frequency of the received signal, by definition, corresponds to the value of frequency $f$ for which the test function $q(f)$ is a maximum, signals proportional to the first derivative $q'(f)$ and second derivative $q''(f)$ of the test function are developed by derivative apparatus 15 and 16, respectively. Any suitable apparatus for forming the derivative of an applied signal may be utilized. As is well known, a relative maximum is present when the first derivative is equal to zero and the second derivative of an applied function is less than zero. AND gate 17, responsive to the output signals of derivative apparatus 15 and 16, is activated when this condition is satisfied. Accordingly, the presence of a signal at the output of gate 17 is indicative of the presence of a signal having a frequency, $f$ at which the maximum occurs. Of course, this indication may be falsely based on the presence of a noise signal, solely, rather than an intelligence signal. It is thus necessary to determine if an intelligence signal, masked by noise, has been received or simply a noise signal at the indicated frequency.

It has been found that a likelihood ratio test for the presence of an intelligence signal may be utilized which, fortuitously, is also proportional to the test signal $q(f)$. The test signal $q(f)$ is determined by the apparatus shown in the drawing and is available at the output of network 14. When a maximum occurs in the test function, indicated by a signal at the output of gate 17, gate 18 is activated. The test function $q(f)$, at the estimated frequency $\hat{f}$, is therefore applied to decision function apparatus 19.

According to decision theory, the hypothesis that signal plus noise has been received will be accepted if the likelihood ration is greater than some predetermined constant. Establishing the value of this predetermined constant, sometimes referred to as a threshold or bias, is similar to establishing a false alarm rate for radar signals, discussed, for example, on pages 403–413 of Information Transmission, Modulation, and Noise, authored by M. Schwartz, McGraw-Hill, 1959. The threshold may be stablished empirically by applying at the input of spectrum analyzer 11 a known signal contaminated by noise and measuring the number of false alarms indicated by decision apparatus 19 as its bias or threshold value is manually or electronically adjusted by apparatus 24. The threshold may then be adjusted to minimize the number of incorrect or false alarm indications. Of course, since we are dealing with a random process, the presence of a signal may not be determined with absolute certitude.

If so desired, as well known by those skilled in the art, the value of a threshold may be established by a statistical analysis of the applied signal. The Neyman-Pearson criterion may be used to determine the threshold level. In this case, the bias is determined by the properties of Gaussian noise in order to yield a probability of false alarm equal to or less than a predetermined constant. The likelihood ratio test insures that a maximum number of correct decisions will be made for a predetermined probability of false alarm. A discussion of likelihood tests and their relationship to the Neyman-Pearson criterion may be found on pages 322 to 327 of An Introduction to the Theory of Random Signals and Noise, authored by Davenport and Root, McGraw-Hill, 1958.

Decision apparatus 10 may take many forms; a gate circuit with an adjustable threshold has been found adquate. In accordance with the practice of this invention, if the test function $q(f)$ exceeds the predetermined threshold, established by apparatus 24, a signal appears at the output of apparatus 19 which activates gates 21 and 22. Since the presence of an output signal indicates that an intelligence signal has been detected, the values of phase and frequency determined by apparatus 12 and 11 correspond, respectively, to the parameters $$\hat{\varphi}(f) \text{ and } \hat{f}$$

of a true intelligence signal and not noise. The parameter information available at the outputs of gates 21 and 22 is applied to any suitable utilization device 23, for example, an oscilloscope.

It is to be understood that the embodiments shown and described are illustrative of the principles of this invention only and that further modification of this invention may be employed by those skilled in the art without departing from the scope and spirit of the invention. For example, spectrum analyzer 11 and its associated signal processing apparatus, 12, 13, 13' and 14 may take diverse forms without departing from the practice of this invention.

What is claimed is:

1. Receiver apparatus comprising:
   means responsive to an applied signal for developing signals proportional to the sum of the squared real and squared imaginary components of the spectrum of said applied signal and proportional to the frequency and phase of said applied signal,
   means for determining if a maximum occurs in said proportional sum signal,
   means for determining if said determined maximum exceeds a predetermined threshold value, and
   means actuated when said determined maximum exceeds said threshold value for sampling at least one of said signals respectively proportional to the phase and frequency of said applied signal.

2. Signal detection apparatus comprising:
   means responsive to an applied signal, masked by noise, for simultaneously developing a first signal proportional to the squared amplitude spectrum of said applied signal, a second signal proportional to the frequency of said applied signal, and a third signal proportional to the phase of said applied signal,
   means for developing an output signal upon the occurrence of a maximum in said first signal,
   means responsive to said output signal for developing a control signal whenever said output signal exceeds a predetermined threshold value, and
   means responsive to said control signal for simultaneously sampling the instantaneous value of said second signal and said third signal.

3. Apparatus for detecting the presence of a signal contaminated by noise and determining the frequency of said detected signal comprising:
   means responsive to an applied signal, contaminated by noise, for simultaneously developing a first signal proportional to the squared amplitude spectrum of said applied signal and a second signal proportional to the frequency of said applied signal,
   means for developing an indication when a maximum occurs in said first proportional squared amplitude spectrum signal, means responsive to said developed indication for developing a control signal whenever said maximum exceeds a predetermined threshold value, and means responsive to said control signal for sampling the value of said second signal.

4. Signal detection apparatus comprising:

means responsive to an applied signal for developing three signals respectively, a first signal proportional to the real part of the spectrum of said applied signal, a second signal proportional to the imaginary part of the spectrum of said applied signal and a third signal proportional to the frequency of said applied signal, means for developing a signal proportional to the phase of said applied signal corresponding to the value of the inverse tangent of the ratio of said first and said second signals, means for developing a signal proportional to the sum of the squares of said first and second signals, means for determining if a maximum occurs in said proportional sum signal, and means for determining the respective values of said signal proportional to the frequency of said applied signal and said signal proportional to the phase of said applied signal when said maximum exceeds a predetermined threshold value.

5. The method of detecting the presence of applied signals contaminated by noise and determining preselected parameters of said detected signals comprising the steps of:

developing a signal proportional to the frequency of said applied signals, developing a signal proportional to the phase of said applied signals, developing a signal proportional to the sum of the squares of the real and imaginary components of the spectrum of said applied signals, determining if a maximum occurs in said proportional sum signal, determining if said maximum exceeds a predetermined threshold value, and sampling, respectively, said signals corresponding to the frequency and phase of said applied signal if said maximum occurs and exceeds said threshold value.

References Cited
UNITED STATES PATENTS

| | | | |
|---|---|---|---|
| 2,161,764 | 6/1939 | Minton | 324—77 |
| 2,268,998 | 1/1942 | Bay | 325—475 |
| 2,397,961 | 4/1946 | Harris | 328—144 |
| 2,490,530 | 12/1949 | Loughlin | 324—77 |
| 2,887,576 | 5/1959 | Harmuth | 328—144 |
| 3,092,776 | 6/1963 | Castellini | 328—165 |
| 3,095,541 | 6/1963 | Ashcraft | 324—77 |
| 3,214,700 | 10/1965 | Hook | 328—151 |

DONALD D. FORRER, Primary Examiner

H. A. DIXON, Assistant Examiner

U.S. Cl. X.R.

307—235; 324—77; 328—139, 151